(12) United States Patent
Hosotsubo

(10) Patent No.: US 9,354,770 B2
(45) Date of Patent: May 31, 2016

(54) INFORMATION PROCESSING APPARATUS DISPLAYING PATH INFORMATION IN REVERSE HIERARCHICAL ORDER

(71) Applicant: CANON KABUSHIKI KAISHA, Tokyo (JP)

(72) Inventor: Toshihiko Hosotsubo, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 13/901,418

(22) Filed: May 23, 2013

(65) Prior Publication Data

US 2013/0326400 A1 Dec. 5, 2013

(30) Foreign Application Priority Data

May 31, 2012 (JP) ................................ 2012-124798

(51) Int. Cl.
*G06F 3/048* (2013.01)
*G06F 3/0481* (2013.01)
*G06F 3/0485* (2013.01)
*G06F 3/0482* (2013.01)

(52) U.S. Cl.
CPC ............ *G06F 3/0481* (2013.01); *G06F 3/0482* (2013.01); *G06F 3/04855* (2013.01)

(58) Field of Classification Search
CPC ........................... G06F 3/0485; G06F 17/2241
USPC .................................................. 715/243, 247
See application file for complete search history.

(56) References Cited

U.S. PATENT DOCUMENTS

| | | | |
|---|---|---|---|
| 6,462,762 B1 * | 10/2002 | Ku | G06F 3/0481 707/E17.01 |
| 6,557,002 B1 * | 4/2003 | Fujieda | G06F 17/50 |
| 7,574,445 B2 * | 8/2009 | Chai | G06F 17/30067 |
| 7,694,233 B1 * | 4/2010 | Ording | 715/790 |
| 8,473,868 B1 * | 6/2013 | Kauffman | 715/854 |
| 8,561,008 B2 * | 10/2013 | Steiner | G06F 9/4443 715/819 |
| 2002/0032696 A1 * | 3/2002 | Takiguchi | G06F 17/30126 715/255 |
| 2003/0132911 A1 * | 7/2003 | Narioka | G06F 17/30067 345/156 |
| 2003/0140135 A1 * | 7/2003 | Okuyama | H04L 12/40013 709/223 |

(Continued)

FOREIGN PATENT DOCUMENTS

| | | |
|---|---|---|
| JP | 2007-232920 | 9/2007 |
| JP | 2007-232920 A | 9/2007 |

(Continued)

OTHER PUBLICATIONS

Japanese Office Action issued Feb. 23, 2016 during prosecution of related Japanese application No. 2012-124798.

*Primary Examiner* — Tadeese Hailu
(74) *Attorney, Agent, or Firm* — Fitzpatrick, Cella, Harper & Scinto

(57) ABSTRACT

In displaying path information, in a case where the path information cannot be displayed in a display area, and thus information of an intermediate hierarchy of the path information is displayed in an abbreviated manner, it becomes ambiguous that a folder of a deepest level of a hierarchy specifically belongs to which folder. It is determined whether or not the path information fits in the display area, in a case where the path information does not fit in the display area, the path information in the display area is displayed in reverse hierarchical order so that information of the deepest hierarchy is displayed at a head of the path information.

9 Claims, 18 Drawing Sheets

(56) References Cited

U.S. PATENT DOCUMENTS

| | | | | |
|---|---|---|---|---|
| 2005/0223315 | A1* | 10/2005 | Shimizu | G06F 17/241 715/230 |
| 2006/0036568 | A1* | 2/2006 | Moore | G06F 17/30126 |
| 2008/0141163 | A1* | 6/2008 | Kira | G06F 3/0482 715/781 |
| 2008/0303823 | A1* | 12/2008 | Yanagawa | G10H 1/0008 345/467 |
| 2009/0094322 | A1* | 4/2009 | Uno | G06F 17/30905 709/203 |
| 2010/0205566 | A1* | 8/2010 | Matoba | G06F 3/0488 715/838 |
| 2011/0282853 | A1* | 11/2011 | Masao | G06F 17/30386 707/705 |
| 2011/0289408 | A1* | 11/2011 | Chitlur | G06F 3/0481 715/702 |
| 2011/0289448 | A1* | 11/2011 | Tanaka | G06F 17/30126 715/781 |
| 2012/0313966 | A1* | 12/2012 | Kamekawa | G06F 3/0482 345/619 |
| 2012/0331020 | A1* | 12/2012 | Morishita | G06F 17/3028 707/822 |

FOREIGN PATENT DOCUMENTS

| | | | | |
|---|---|---|---|---|
| JP | 2008-97397 | | 4/2008 | |
| JP | 2008210376 | A * | 9/2008 | G06F 10/00 |
| KR | 10-2007-0003169 | * | 11/2007 | G06F 17/00 |

* cited by examiner

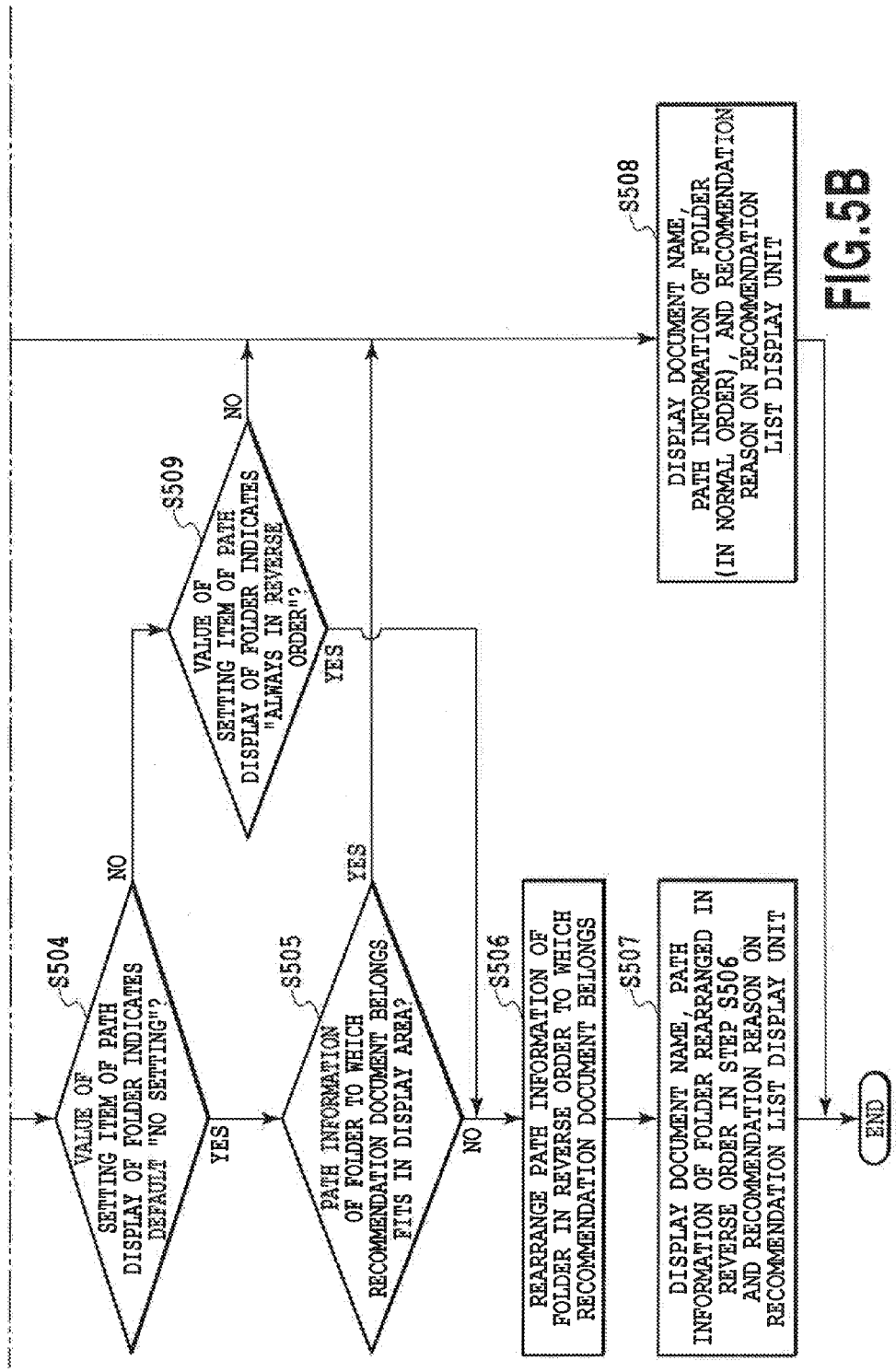

INFORMATION PROCESSING APPARATUS DISPLAYING PATH INFORMATION IN REVERSE HIERARCHICAL ORDER

BACKGROUND OF THE INVENTION

1. Field of the Invention

The present invention relates to an information processing apparatus for displaying hierarchical paths of a folder etc.

2. Description of the Related Art

In Japanese Patent Laid-Open No. 2007-232920, a method has been proposed in which in hierarchical information, such as a path of a file or a folder, being displayed, when the information does not fit in a display area, the number of characters of the information is limited to display the information in an abbreviated manner. In addition, in Japanese Patent Laid-Open No. 2007-232920, a method has been also proposed in which information in a deepest level of a hierarchy is displayed, but information in the other levels of the hierarchy is displayed in the abbreviated manner so as to fit in a display area. For example, in a case where path information, such as "AAAA/BBBB/CCCC/DDDD", does not fit in a display area, the path information is displayed in the abbreviated manner as "A . . . /B . . . /C . . . /DDDD". Note that "AAAA/BBBB/CCCC/DDDD" represents a hierarchical structure in which a folder "BBBB" exists under a folder "AAAA", a folder "CCCC" under the folder "BBBB", and a folder "DDDD" further under the folder "CCCC". The character "/" denotes a delimiter of a path.

However, there has been a problem that a suitable technique for easily determining path information of a folder does not exist. For example, in Japanese Patent Laid-Open No. 2007-232920, information of an intermediate hierarchy is displayed in the abbreviated manner, and thus it becomes ambiguous that information in the deepest level of a hierarchy specifically belongs to which name's hierarchy. Therefore, in a display device that displays a list arranging a plurality of path information of folders, when folders with a same folder name in the deepest level of the hierarchy are displayed, it becomes difficult to determine differences of the folders from one-up folder names. For example, when pieces of path information of two different folders of "AAAA/BBBB/CCCC/DDDD" and "AAAA/BBBB/C123/DDDD" are displayed side by side in a list, abbreviations thereof are both "A . . . /B . . . /C . . . /DDDD". Therefore, it becomes difficult to determine which path is a target folder, from the abbreviated display "C . . . " of the one-up folders for the folders "DDDD".

SUMMARY OF THE INVENTION

An information processing apparatus according to the present invention includes a determination unit configured to determine whether or not path information fits in a display area, and a display unit configured to display the path information in the display area in reverse hierarchical order so that information in a deepest level of a hierarchy is displayed at a head of the path information, in a case where the determination unit determines that the path information does not fit in the display area.

According to the present invention, path information of a folder can be easily determined.

Further features of the present invention will become apparent from the following description of exemplary embodiments (with reference to the attached drawings).

BRIEF DESCRIPTION OF THE DRAWINGS

FIG. 5 is a diagram showing the relationship of FIGS. 5A and 5B;

FIGS. 5A and 5B indicate a flow chart as one example at the time of updating information of a recommendation list of the document management client application 301 in the embodiment 1 of the present invention;

DESCRIPTION OF THE EMBODIMENTS

Hereinafter, embodiments of the present invention will be described using drawings.

[Embodiment 1]

Figure 1:
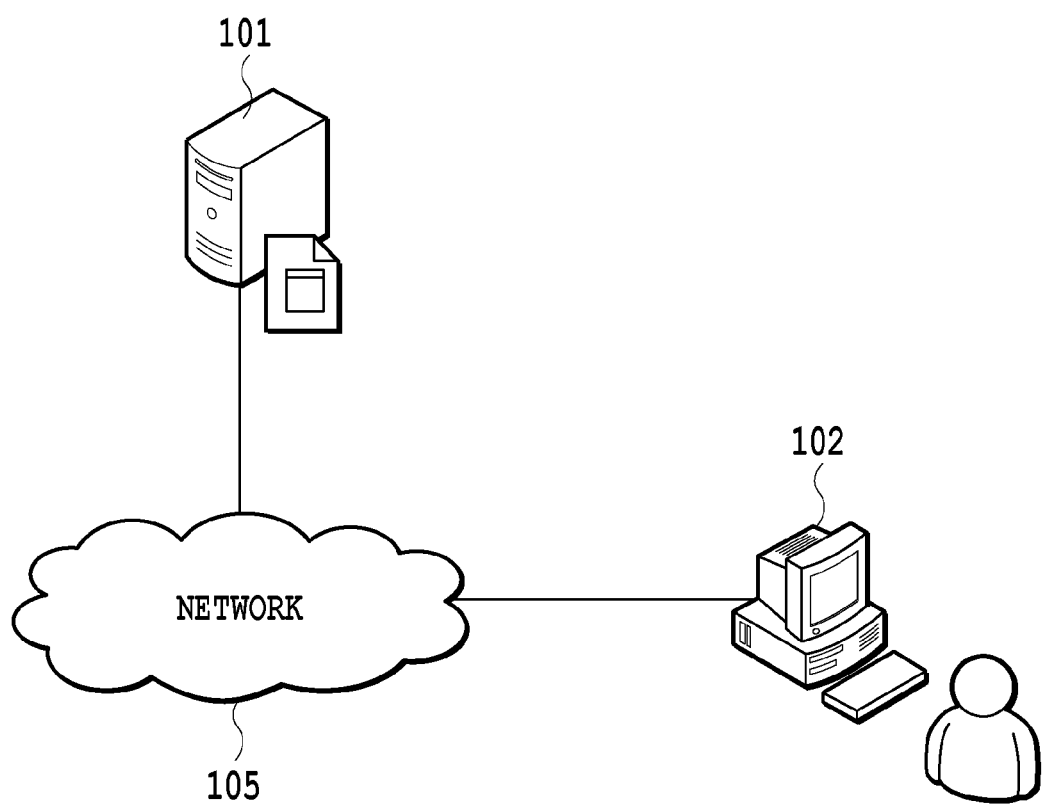
FIG. 1 is a schematic diagram illustrating a system configuration example in an embodiment 1 of the present invention.

FIG. 1 is a schematic diagram illustrating a system configuration example in an embodiment of the present invention. A system of FIG. 1 includes a document management server 101, a client PC (client computer) 102, and a network 105. The network 105 is a network such as an Internet and an intranet, and connected to network-enabled equipment, such as the document management server 101 and the client PC 102. The document management server 101 provides general management service of document data, such as document save and search. Note that document data managed by the document management server can be regarded to be similar to file data managed by a file system. Hereinafter, in order to simplify the description, the document data managed by the document management server is simply referred to as a document. A plurality of client PCs 102, not shown, is connected to the network 105. In the client PC 102, a document management client utilizing the document management service that the document management server provides runs. Although the document management client is an application that runs on various operating systems, such as Microsoft Windows (registered trademark), Linux (registered trademark) or the like, the application may run on a Web browser. Note that in a case where the network 105 is set as the Internet, the document management server 101 may exist as cloud service. In that case, a Web server, a proxy server, etc. that are required for a general cloud service configuration can be added to the system configuration shown in FIG. 1.

Figure 2:
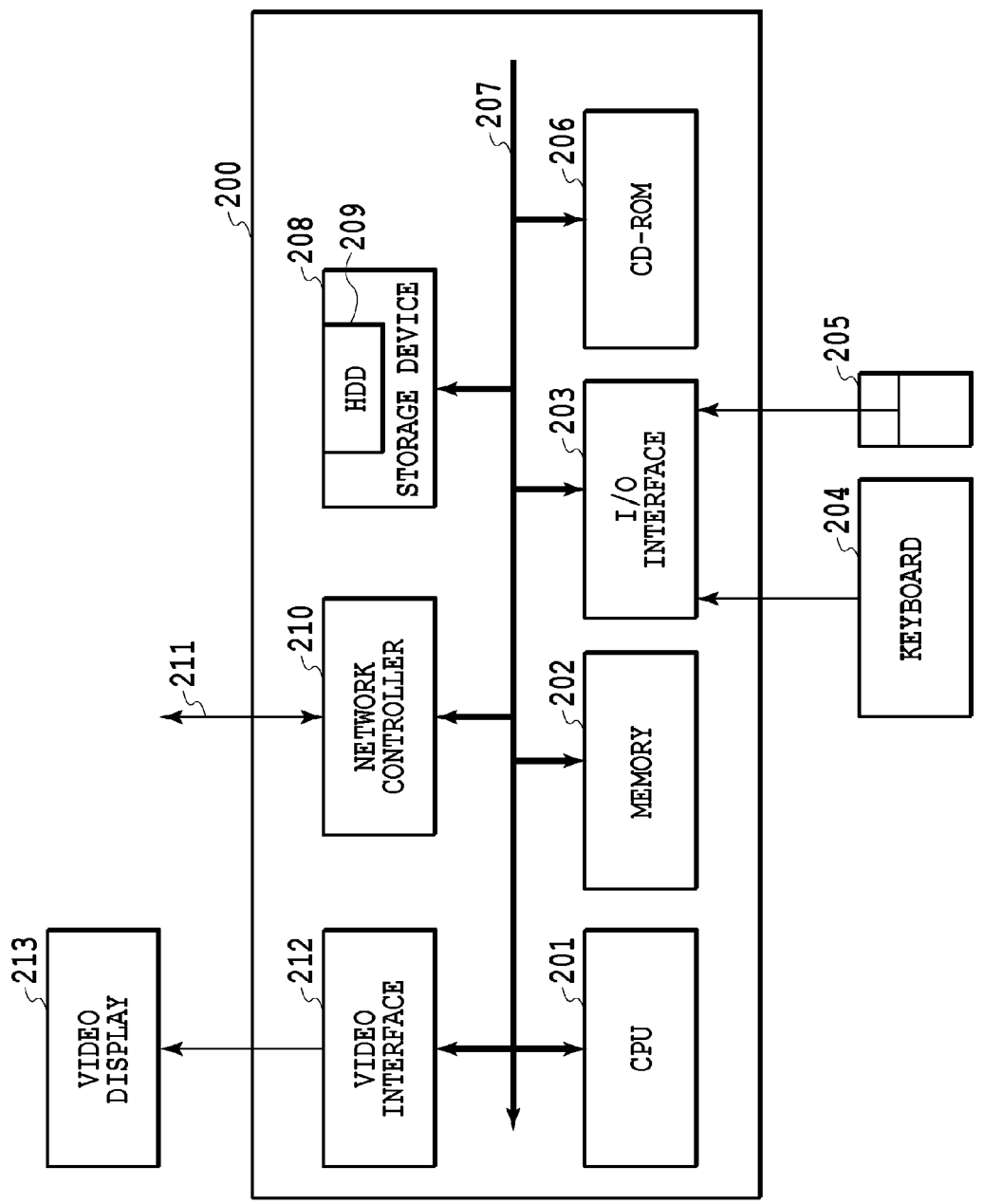
FIG. 2 is a block diagram illustrating a configuration example of a typical general-purpose computer module 200 in the embodiment 1 of the present invention.

FIG. 2 is a block diagram illustrating a configuration example of a typical general-purpose computer module 200 in the embodiment of the present invention. The document management server 101 and the client PC 102 can be configured as information processing apparatuses that have the typical general-purpose computer module as shown in FIG. 2.

Input devices, such as pointing devices like a keyboard 204 and a mouse 205, and output devices, such as a display device 213, are connected to the general-purpose computer module 200.

A network controller (NC) 210 is connected to the network 105 through a predetermined network interface 211, and executes control processing of communication with other network equipment. A CPU 201 is configured by at least one processor. A memory 202 is configured by a RAM and a ROM. A video interface 212 outputs an image to the display device 213. An I/O interface 203 receives an input by operation from the keyboard 204 and the mouse 205. In addition, the I/O interface 203 may receive an input from a touch panel integrated with the display device 213. A storage device 208 typically includes an HDD (hard disk drive) 209. A silicon drive that is not shown may be included in the storage device in some cases. A CD-ROM drive 206 is used as a nonvolatile data source. An interconnection bus 207 mediates communication among respective blocks by the CPU 201 in accordance with operating systems, such as Microsoft Windows (registered trademark), Linux (registered trademark) or the like that runs on the general-purpose computer module 200.

Note that various control programs shown in a flow chart in the client PC 102 in the embodiment are stored in storage units as either of the respective memories 202 and storage devices 208, and are executed by the respective CPUs 201. In addition, the document management server 101 has a database for document management, and the database can also be constructed on the storage device 208. It is to be noted that although FIG. 2 illustrates the general-purpose computer module 200 as an example, a similar configuration may be achieved in a distributed system constituted by a plurality of computer devices.

Figure 3:
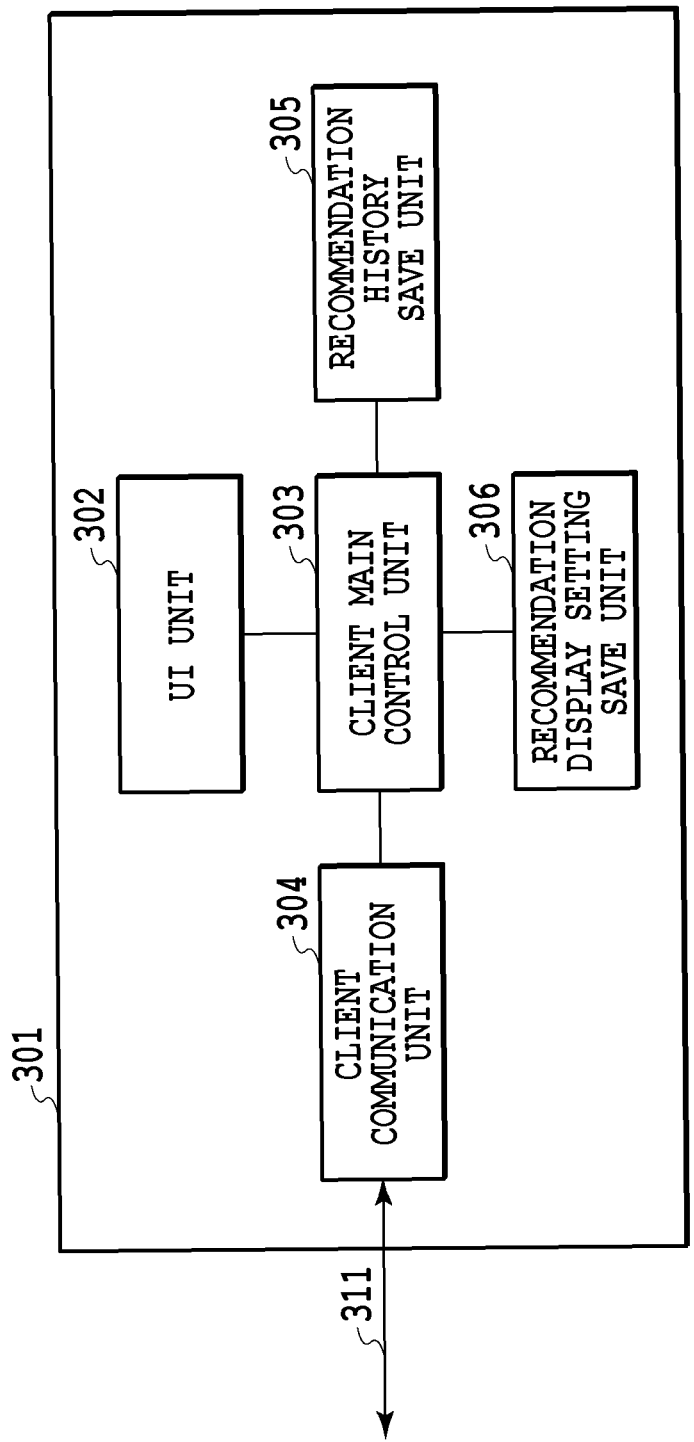
FIG. 3 is a block diagram illustrating a software configuration example of a document management client application in the embodiment 1 of the present invention.

FIG. 3 is a block diagram illustrating a software configuration example of a document management client application. A document management client application 301 is provided with user interfaces for executing various functions, receives a request from a user through the keyboard 204, the mouse 205, etc. on a screen of the display device 213, and executes each function processing. Blocks 302 to 306 denote components that constitute the application.

Figure 4:
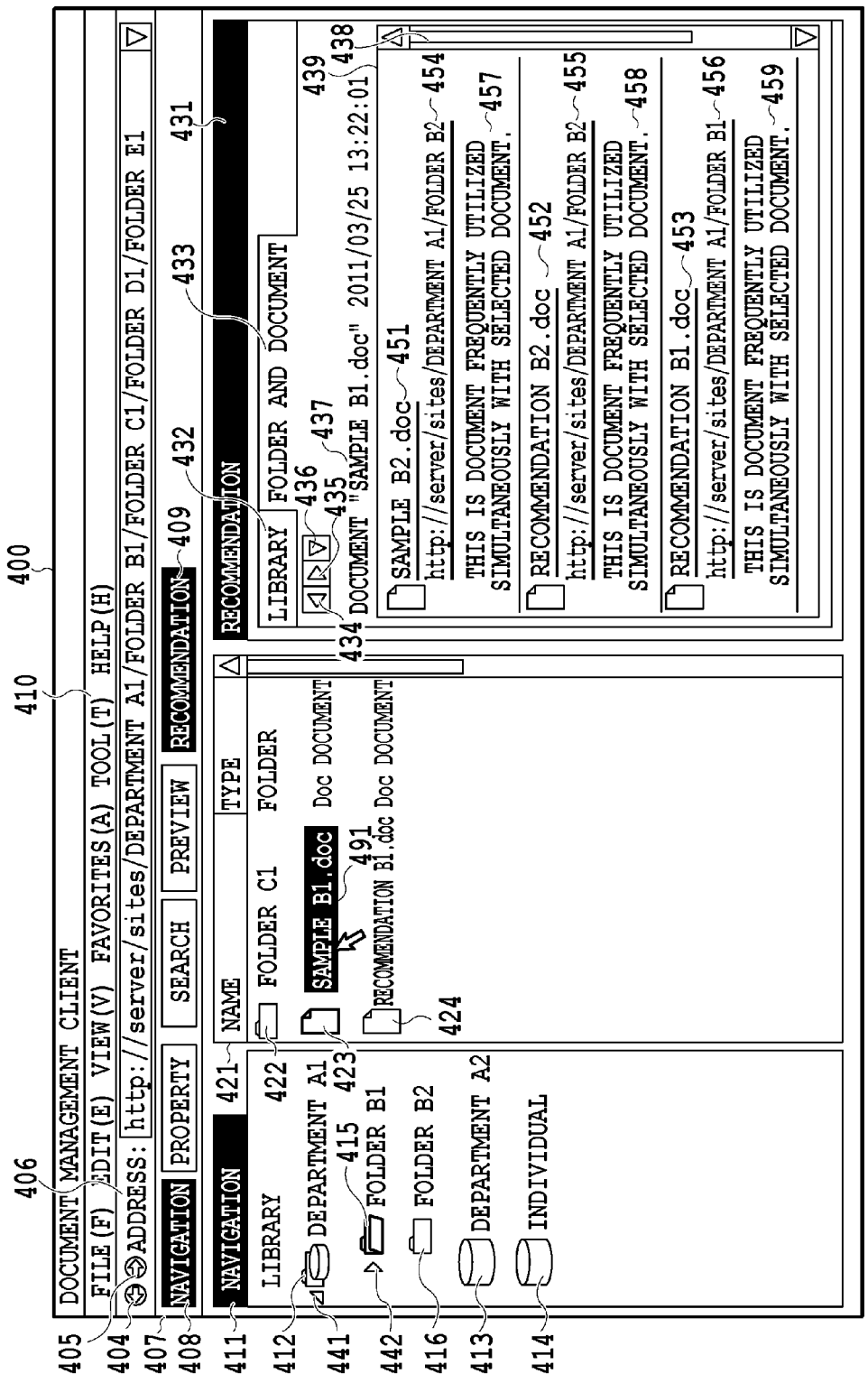
FIG. 4 is a screen view showing a display example of a UI unit 302 of a document management client application 301 in the embodiment 1 of the present invention.

A UI unit 302 constructs user interfaces shown in FIG. 4, receives various input operation from a user, and displays a processing result and a recommendation result through the input operation.

A client main control unit 303 determines a document operation request received from a user through the UI unit 302, performs a request for document operation and recommendation list acquisition to the document management server 101 through a client communication unit 304, and requests a response. The client main control unit 303 then changes display of the UI unit 302 based on the response result received from the document management server 101. The client main control unit 303 is executed, for example, by the CPU 201.

The client communication unit 304 performs communication with the document management server 101 based on control by the client main control unit 303.

A recommendation history save unit 305 saves a recommendation list that the client main control unit 303 has received from the document management server 101 as a response to the recommendation list acquisition in the memory 202, the HDD 209, etc. as a recommendation history. The recommendation list is the list of recommendation documents including information such as names of recommended documents, path information of folders to which the recommended documents belong, and reasons for recommendation. The client main control unit 303 acquires every recommendation list from the document management server 101, generates one recommendation history item corresponding to the recommendation list in the recommendation history save unit 305.

A recommendation display setting save unit 306 saves system setting of recommendation display in the memory 202 or the HDD 209 as application data.

An interface 311 is the interface for connecting to a document management server, which is configured by the network controller (NC) 210, the network interface 211, or etc.

FIG. 4 is a screen view showing a display example of a recommendation list at the time of selecting a document in the UI unit 302 of the document management client application 301.

In FIG. 4, reference numeral 400 denotes a main window. Reference numeral 411 denotes a navigation pane. A library registered in the application, and folders arranged under the library are displayed on the navigation pane 411. The library referred to here means a save unit (also referred to as a database) for performing document management in the document management server 101. The document management server 101 provides one or more libraries, and provides a function of document management using a hierarchical structure of the folder under each library. The client PC 102 enters one or more these libraries to utilize the function of the document management provided from the document management server 101. In FIG. 4, reference numerals 412 to 414 denote libraries. A user can move a current location by selecting the library or the folder arranged under the library in the navigation pane, the current location being used for identifying a document and a subfolder displayed in a file list view pane 421. In FIG. 4, the libraries 412 to 414, and folders 415 and 416 under the library 412 are displayed on the navigation pane, and it is shown that the folder 415 is selected as the current location.

Reference numerals 441 and 442 denote expansion buttons with which a tree of a folder hierarchical structure is expanded. The expansion buttons 441 and 442 are toggle buttons for expansion and collapse of the tree. The expansion button 441 indicates an expanded state of the tree, and the expansion button 442 indicates a collapsed state of the tree. The expansion button 442 that indicates the collapsed state of the tree is displayed in a case where the library or the folder is selected by the mouse 205 etc. The expansion button 441 that indicates the expanded state of the tree is displayed in a case where the tree is in the expanded state.

Reference numeral 421 denotes a file list view pane. The folder selected in the navigation pane 411, or a document and a folder that are stored in the current location of the library are displayed on the file list view pane 421. In FIG. 4, a subfolder 422, and documents 423 and 424 stored in the folder 415 selected as the current location on the navigation pane 411 are displayed.

Reference numeral 406 denotes an address bar, and displays a path of a URL of the current location selected on the navigation pane or the file list view pane.

Reference numeral 404 denotes a button to go back to a location previous to the location selected on the navigation pane or the file list view pane. Reference numeral 405 denotes a button to go forward to a next location from the location of the URL which backed through the back button 404.

Reference numeral 407 denotes a panel to switch display and non-display of the pane, and is provided with a button 408 to switch display and non-display of the navigation pane 411, a button 409 to switch display and non-display of a recommendation pane 431, etc.

Reference numeral 410 denotes a menu from which a command for instructing the document management client application 301 is selected, which has a hierarchical menu structure of having a [Setup] menu under a [Tool] menu, etc.

Reference numeral 431 denotes the recommendation pane. In a case where operations, such as connection to the libraries 412 to 414, etc., a selection of the folders 415, 416, 422, etc. for changing the current location which is used for specifying a document and a subfolder displayed in the file list view pane, or selection or opening of the documents 423, 424, etc., are performed, a recommendation document with respect to the operation is displayed in the recommendation pane 431.

The displayed recommendation document is the recommendation list acquired from the document management server 101. In FIG. 4, with selection of a document "Sample B1.doc" on the file list view pane 421, a recommendation document with respect to the document "Sample B1.doc" is displayed.

Reference numeral 432 denotes a tab of recommendation related to the library, and switches display of the recommendation pane 431 to an area where a recommendation list is displayed in the operation of connecting to the library being performed. In the recommendation list in connecting to the library, for example, a document frequently utilized under the library is calculated and listed by the document management server 101.

Reference numeral 433 denotes a tab of recommendation related to the folder and the document, and switches display of the recommendation pane 431 to an area where a recommendation list is displayed in the operation, such as a selection of the folder, or selection or opening of the document, being performed.

In the recommendation list displayed by the selection of the folder, for example, a document frequently utilized under the folder is calculated and listed by the document management server 101.

In the recommendation list in selecting or opening the folder, for example, a document frequently utilized simultaneously with the document is calculated and listed by the document management server 101.

A tab 432 of the recommendation related to the library and a tab 433 of the recommendation related to the folder and the document can be switched by selection of the tab through the mouse, the keyboard, etc.

UI components of reference numerals 434 to 436 are respectively displayed at the time of selecting any one of the library tab 432, and the folder and document tab 433.

Reference numeral 437 denotes a label indicating a name example applied to a recommendation list displayed on a current recommendation list display unit 439. The name of the label applied to the recommendation list is adaptively configured, for example, using each character string of a type of a recommendation target, a name of the recommendation target, and a recommendation time. As the character string of the type of the recommendation target, a "library" is given in a case where the recommendation list is the one at the time of connection operation to the library, a "folder" in a case where the recommendation list is the one at the time of selection of the folder, and a "document" in a case where the recommendation list is the one at the time of selection or opening operation of the document. In the case where the recommendation list is the one at the time of connection operation to the library, the name of the recommendation target is a name of a connected library. In addition, in the case where the recommendation list is the one at the time of selection of the folder, the recommendation target is a name of a destination folder; and in the case where the recommendation list is the one at the time of selection or opening operation of the document, the recommendation target is a name of a selected or an opened document. The recommendation time is a character string indicating date and time in a case where the document management client application 301 received the recommendation list from the document management server 101 as a response for recommendation list acquisition.

Reference numeral 439 denotes a recommendation list display unit, and displays the recommendation list that the document management client application 301 has acquired from the document management server 101.

Reference numerals 451 to 459 denote displays of each item included in the recommendation list.

Reference numerals 451 to 453 denote displays of recommendation documents relevant to a selecting document 491. Document names of the respective recommendation documents are displayed as labels therein. The label is hyperlinked, and in a case where the label is clicked by the mouse 205 etc., through the document management client application 301, a document for a link destination is acquired from the document management server 101, and opened.

Reference numerals 454 to 456 denote path information of folders to which the recommendation documents belong, and path information of the folders to which the recommendation documents 451 to 453 belong are displayed as labels, respectively. The label is hyperlinked, in a case where the label is clicked by the mouse 205 etc., the process can jump to the folder indicated by the label. Specifically, the appropriate folder is selected as a current location on the navigation pane 411 by the document management client application 301, and documents and folders that are stored in the folder are displayed on the file list view pane 421. It is to be noted that although an example is given where an HTTP protocol is used for path information in FIG. 4, the path information may be displayed using other protocols.

Display of the path information of the folders to which the recommendation documents belong, such as reference numerals 454 to 456, is one of information that inspires a user to open the recommendation document displayed in the recommendation pane. In document management using a hierarchical structure, a folder name tends to indicate a feature of a document placed under the folder. In addition, the user tends to collect documents relevant to a specific folder. Therefore, even though in a case where a document that the user wants does not exist in the list of the recommendation documents displayed on the recommendation list display unit 439, there is a high possibility of the document that the user wants existing in the folder to which the recommendation document belongs. Therefore, providing a unit configured to make the user easily jump to the folder to which the recommendation document belongs so as for the user to confirm the document under the folder is useful in a system of document recommendation.

Reference numerals 457 to 459 denote character strings indicating recommendation reasons for the respective recommendation documents 451 to 453. The recommendation reason is also one of the useful information that inspires the user to open the recommendation document displayed in the recommendation pane. The character string indicating the recommendation reason varies depending on the type and the recommended reason of the recommendation target.

[Behavior at the Time of Information Update of Recommendation List]

Figure 5A:
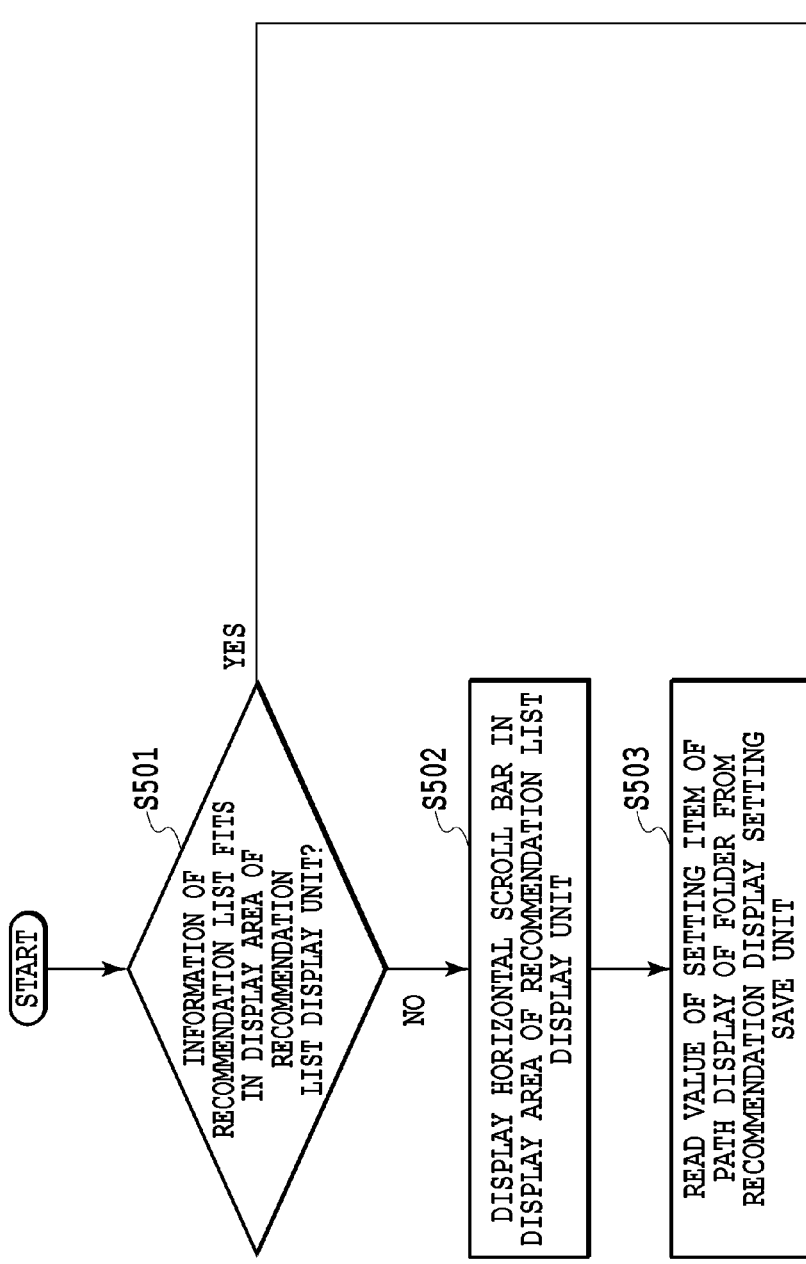

FIGS. 5A and 5B are a flow chart at the time of information update of a recommendation list in the document management client application 301.

Behavior of the document management client application 301 will be described using the flowchart in FIGS. 5A and 5B. The client main control unit 303 implements the following steps in displaying the information of the recommendation list acquired from the document management server 101 on the UI unit 302.

In step S501, the client main control unit 303 determines whether or not the information of the recommendation list acquired from the document management server 101 fits in a display area of the recommendation list display unit 439 of the UI unit 302. For example, determination of S501 is performed by comparing the display area of the recommendation list display unit 439, and a display area in a case of displaying a character string of each item included in the acquired recommendation list with a font size set to the recommendation list display unit 439.

In step S501, in determining that the information of the recommendation list acquired from the document management server 101 does not fit in the display area of the recommendation list display unit 439 through the UI unit 302, the client main control unit 303 executes the following step S502.

In step S502, the client main control unit 303 displays a horizontal scroll bar on the display area of the recommendation list display unit 439 through the UI unit 302.

Figure 10:
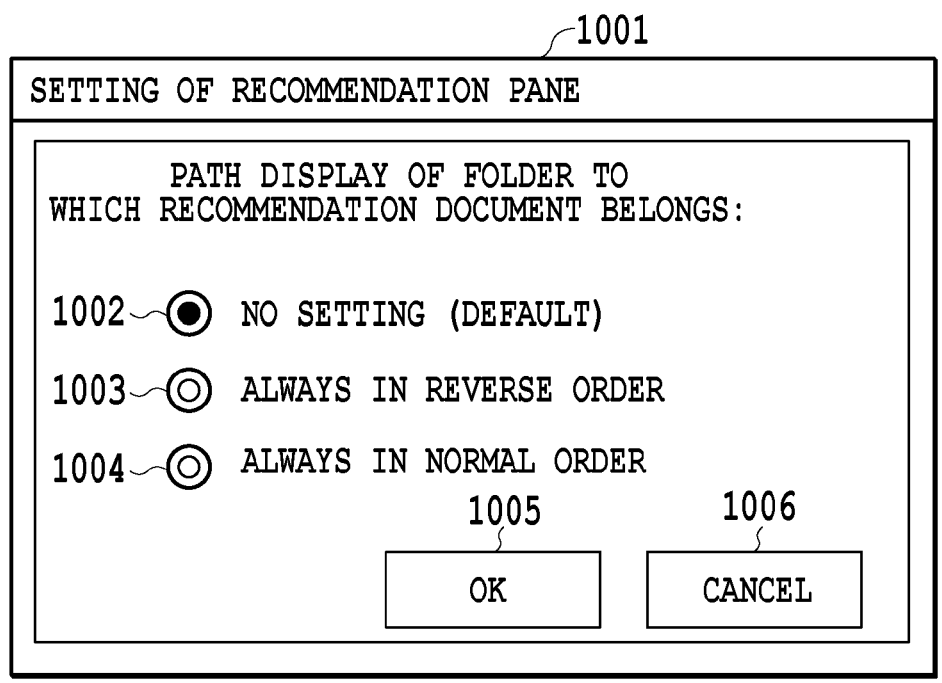
FIG. 10 is a screen view showing a UI example of path display setting items of a folder in the recommendation pane in the embodiment 1 of the present invention.

In step S503, the client main control unit 303 reads a value of a setting item of path display of a folder in a recommendation pane saved in the recommendation display setting save unit 306, as shown in FIG. 10.

In step S504, in a case where the value of the setting item of the path display of the folder in the recommendation pane saved in the recommendation display setting save unit 306 indicates a default "No setting", the client main control unit 303 implements step S505.

In step S505, the client main control unit 303 determines whether or not the path information of the folder to which the recommendation document of the above-described recommendation list belongs fits in the display area of the recommendation list display unit 439. Namely, the client main control unit 303 determines whether or not the whole of the path information can be displayed in the display area without a scroll operation.

In step S505, in determining that the path information of the folder to which the recommendation document of the above-described recommendation list belongs does not fit in the display area of the recommendation list display unit 439 (i.e. in determining that the whole of the path information cannot be displayed in the display area without the scroll operation), the client main control unit 303 executes the following step S506.

In step S506, the client main control unit 303 rearranges the path information of the folder, to which the recommendation document acquired from the document management server 101 belongs, in reverse order. For example, path information in normal order like "AAAA/BBBB/CCCC/DDDD" is rearranged in reverse hierarchical order like "DDDD←CCCC←BBBB←AAAA". "←" is defined as a delimiter for the path at the time of display in reverse order.

In step S507, the client main control unit 303 displays the document name of the recommendation document, the path information of the folder rearranged in reverse order in step S506, and the recommendation reason of the recommendation document on the recommendation list display unit 439. Subsequently, the client main control unit 303 ends the process.

In step S501, in determining that the information of the recommendation list acquired from the document management server 101 fits in the display area of the recommendation list display unit 439 through the UI unit 302, the client main control unit 303 executes step S508.

In addition, in step S505, in determining that the path information of the folder to which the recommendation document of the recommendation list belongs fits in the display area of the recommendation list display unit 439, the client main control unit 303 also executes step S508. It is to be noted that in a case where the determination becomes YES in S505 is, for example, the case where the character string indicating the document name or the recommendation reason of the recommended document in the recommendation list does not fit in the display area.

In step S508, the client main control unit 303 displays the document name of the recommendation document acquired from the document management server 101, the path information (normal order) of the folder to which the recommendation document belongs on the recommendation list display unit 439, and the recommendation reason of the recommendation document, and ends the process.

In step S504, in a case where the value of the setting item of the path display of the folder in the recommendation pane saved in the recommendation display setting save unit 306 does not indicate the default "No setting", the client main control unit 303 executes step S509.

In step S509, the client main control unit 303 determines whether the value of the setting item of the path display of the folder in the recommendation pane saved in the recommendation display setting save unit 306 indicates "always in normal order" or "always in reverse order". In a case of "always in reverse order", the client main control unit 303 then executes step S506.

In addition, in step S509, in a case where the value of the setting item of the path display of the folder in the recommendation pane saved in the recommendation display setting save unit 306 indicates "always in normal order", the client main control unit 303 executes step S508.

By the way, in a case where the horizontal scroll bar is displayed, the client main control unit 303 may always rearrange the path information of the folder to which the recommendation document belongs in the reverse order. In that case, in the above-described flow chart, steps S503 to S505 and S508 to S509 are omitted. By configuring like this manner, the similar effect can be obtained with a simple embodiment.

Figure 8:
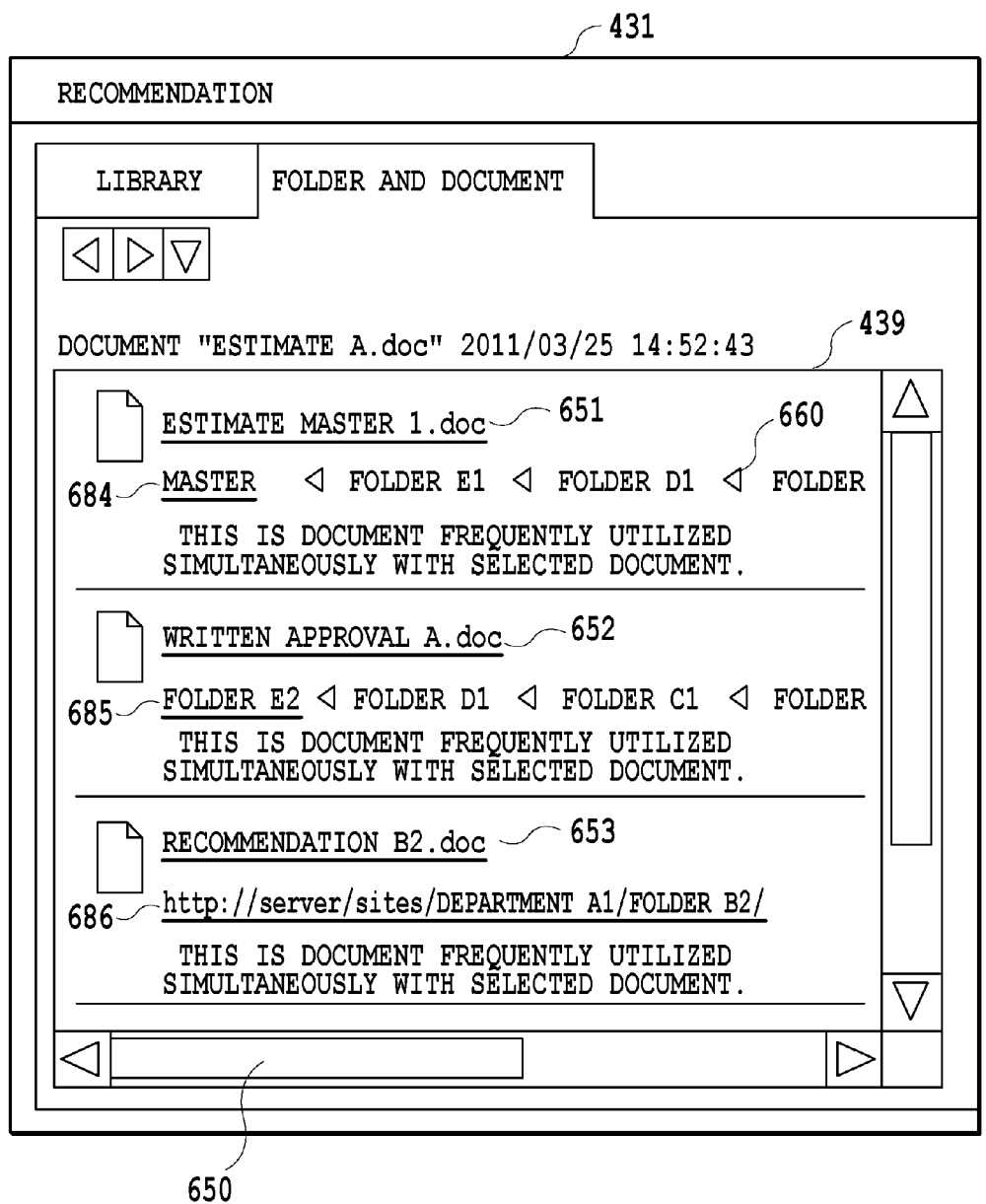
FIG. 8 is a screen view showing other UI example that displays a recommendation pane in the embodiment 1 of the present invention.

In addition to, in step 506 of the flow chart shown in FIG. 5B, the client main control unit 303 rearranges all the path information of the folder to which the recommendation document belongs in the reverse order. However, the system may be configured such that the client main control unit 303 rearranges in step S506 only the path information that has been determined not to fit in the display area of the recommendation list display unit 439 in step S505 in the reverse order, and displays the path information in step S507. FIG. 8 that will be described later is a display example in this case.

Alternatively, in the flow chart shown in FIGS. 5A and 5B, processing in accordance with the recommendation display setting save unit 306 may be performed regardless of the display of the horizontal scroll bar. In this case, processing of steps S501 to S503 can be omitted.

FIG. 10 is an example of the setting items of the path display of the folder in the above-mentioned recommendation pane set to the recommendation display setting save unit 306.

In FIG. 10, reference numeral 1001 denotes a setting dialog in a recommendation pane. The dialog can be opened from the menu 410 of the document management client application 301 separately from the main window 400.

Reference numerals 1002 to 1004 denote radio buttons for the setting values, and only one of them can be selected. A value selected in the dialog is saved in the recommendation display setting save unit 306 by the client main control unit 303 through the UI unit 302.

By setting in the dialog, the display order of the path information of the folder to which the recommendation document belongs can be fixed as display always in reverse order or display always in normal order regardless of the fact that the information of the recommendation list fits/does not fit in the display area of the recommendation list display unit.

Next, a display example of the recommendation pane 431 will be described using FIGS. 6 to 9.

Figure 6:
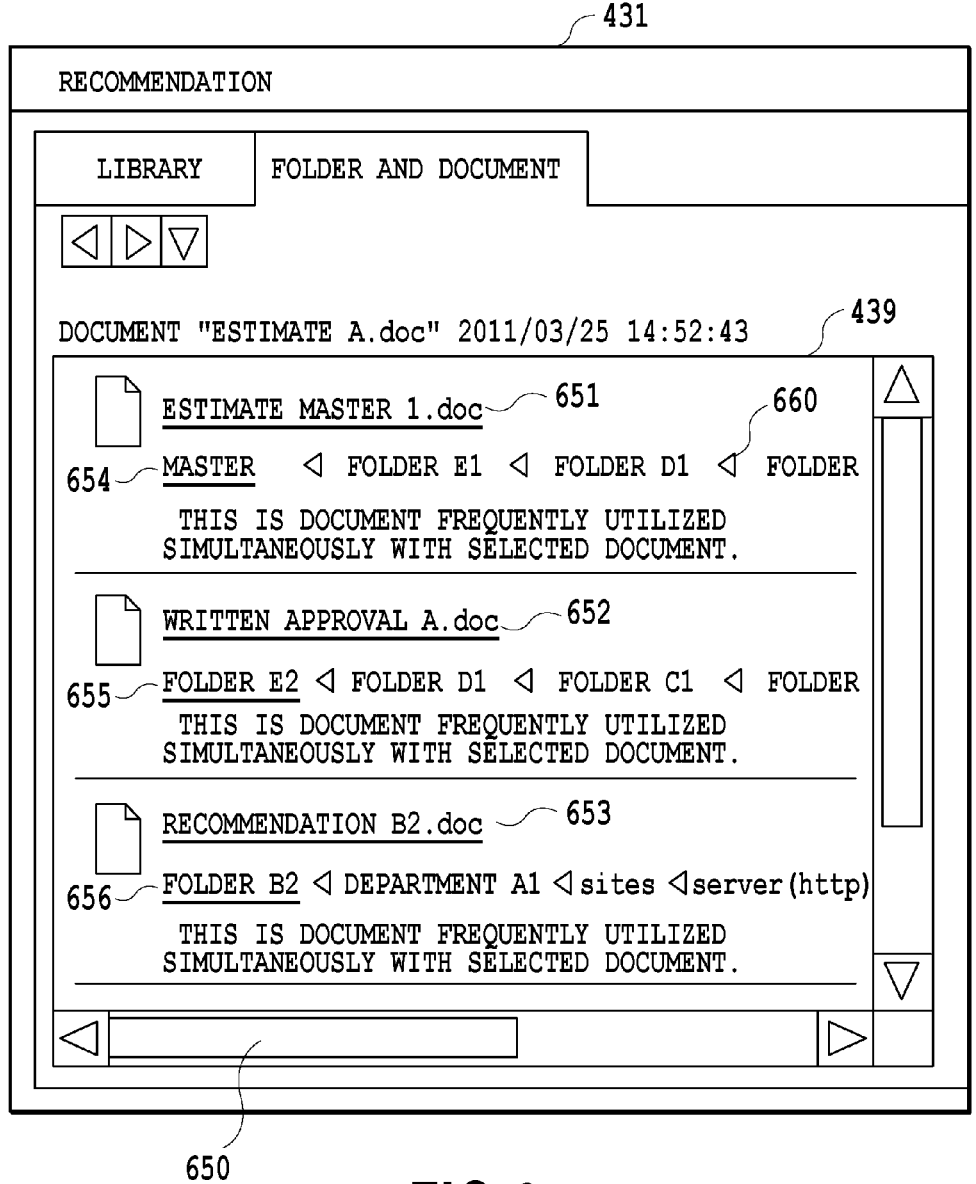
FIG. 6 is a screen view showing a UI example that displays a recommendation pane in the embodiment 1 of the present invention.

FIG. 6 is an example of display of the recommendation pane 431 in a case where the path information display of the folder does not fit in the display area in the document management client application 301. In FIG. 6, reference numeral 650 denotes the horizontal scroll bar.

FIG. 6 shows an execution result in a case where the value of the setting item for the path display of the folder in the recommendation pane saved in the recommendation display setting save unit 306 indicates the default "No setting" in the flow chart shown in FIGS. 5A and 5B. In FIG. 6, reference numerals 654 to 656 denote labels in which path information of folders to which the recommendation documents 651 to 653 belong is displayed in reverse order. Reference numeral 660 denotes a delimiter for the path at the time of display in reverse order.

According to the present embodiment as shown in the example in FIG. 6, the folder to which the recommendation document belongs is displayed at a head of the path information (i.e. at a top of the path information). As shown in the example of FIG. 6, in a case where only a label of the head folder is hyperlinked, the hyperlink enables to jump to the appropriate folder by clicking the hyperlink similarly to the above-described labels 454 to 456 of the path information of the folder in FIG. 4.

As mentioned above, the display of the path information of the folder to which the recommendation document belongs is one of the information that inspires the user to open a document displayed in the recommendation pane. The name of the folder to which the recommendation document belongs is the most important information among the path information. Because the user can connect the folder name and the document name to easily analogize that the document is what kind of document.

Therefore, as in the present embodiment, information of the folder name is located at the head, it becomes easy for the user to discriminate whether or not the recommendation document is the document related to oneself, and it causes a higher effect for inspiring the user to open the document.

In addition, in a case where the recommendation document and the path information of the folder to which the recommendation document belongs are displayed in line with left justification (i.e. in a case where the recommendation document and the path information are aligned on the left-hand side), the path information of the folder to which the document belongs is displayed in reverse order, a group of the document and the folder name to which the document belongs is displayed in line. Specifically, a group of "Estimate master 1.doc" denoted by reference numeral 651 and "Master" denoted by reference numeral 654 in FIG. 6 is displayed in line with left justification. In addition, a group of "Written approval A.doc" denoted by reference numeral 652 and "Folder E2" denoted by reference numeral 655, and a group of "Recommendation B2.doc" denoted by reference numeral 653 and "Folder B2" denoted by reference numeral 656 are also displayed in line with left justification, respectively. As in the present embodiment, the document and the folder name to which the document belongs are displayed in line, and thereby it becomes easy for the user to discriminate a relation between the recommendation document and the folder to which the document belongs. Accordingly, a higher effect of inspiring the user to click and open the appropriate document and folder can be achieved.

Figure 7:
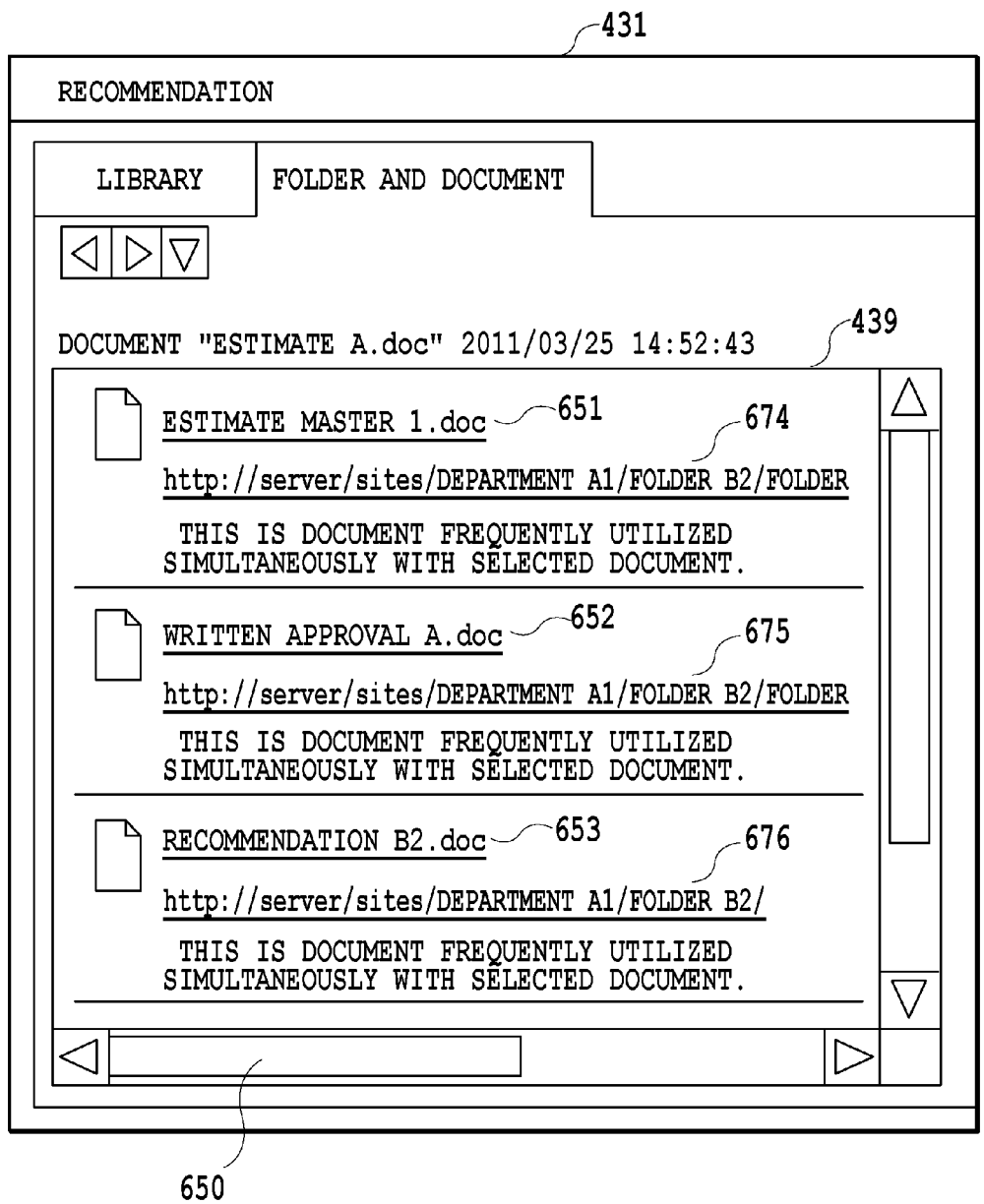
FIG. 7 is a screen view showing other UI example that displays a recommendation pane in the embodiment 1 of the present invention.

FIG. 7 shows an execution result in a case where the value of the setting item of the path display of the folder in the recommendation pane saved in the recommendation display setting save unit 306 indicates "always in normal order" in the flow chart shown in FIGS. 5A and 5B. In FIG. 7, reference numerals 674 to 676 respectively denote labels in which the path information of the folders to which the recommendation documents 651 to 653 belong is displayed. In any labels, the path information is displayed in the normal order. As shown in the labels 674 and 675 of folder names to which the recommendation documents belong in FIG. 7, in a case where the path information is displayed in the normal order, the path information does not fit in the display area of the recommendation list display unit, then the folder names to which the recommendation documents belong are hidden.

In the case where the folder names to which the recommendation documents belong are hidden, it becomes difficult for the user to analogize whether or not the recommendation documents are related to oneself from a relation with the folders contrary to the embodiment of FIG. 6.

In addition, in a case where the display area is scrolled to the right using the horizontal scroll bar 650, display of the recommendation documents 651 to 653 are made to get out of the display area by the right scroll instead of displaying the hidden folder names. In this display state, although the folder names to which the recommendation documents belong can be determined, it cannot be discriminated what the recommendation documents are, and also the appropriate document cannot be opened by clicking the label of the recommendation document.

Therefore, as shown in FIG. 6, display in the reverse order of the path information of the folders to which the documents belong can be a desirable display form, in a case where a link of the document and a link of the path information of the folder to which the document belongs are displayed in line with left justification. Note that the UI as in the present embodiment in which the link of the document and the link of the path information of the folder to which the document belongs are displayed in line with left justification is useful for the system of document recommendation as in the present embodiment, and for display of a search result of a document.

FIG. 8 is, as mentioned above, a display example in the case where only the path information that has been determined not to fit in the display area of the recommendation list display unit 439 in the flow chart of FIGS. 5A and 5B is displayed in the reverse order. In FIG. 8, reference numerals 684 to 686 respectively denote labels in which the path information of the folders to which the recommendation documents 651 to 653 belong is displayed. The labels 684 and 685 of folder names to which the recommendation documents belong are displayed in reverse order since they do not fit in the display area of the recommendation list display unit 439; the label 686 is displayed in normal order since it fits in the display area of the recommendation list display unit 439. Since this display form has no problem such as shown in FIG. 7, the embodiment can be said to be a desirable one.

Figure 9:
FIG. 9 is a screen view showing other UI example that displays a recommendation pane in the embodiment 1 of the present invention.

FIG. 9 is a screen view in which a form of abbreviated display of the path is combined with the form of display in reverse order of the path information of the folders to which the documents belong that is shown in FIG. 6. In FIG. 9, reference numerals 694 to 696 respectively denote labels in which path information of the folders to which the recommendation documents 651 to 653 belong is displayed in reverse order.

As for the labels 694 and 695 of the folder names to which the recommendation documents belong, in addition to the display in reverse order, the abbreviated display " . . . " is combined with a part of the path information that does not fit in the display area. Even this display form has no problem such as shown in FIG. 7. However, in a case where the display area of the recommendation list display unit 439 is narrow, and almost all the hierarchies are displayed in an abbreviated manner, there is a problem that it becomes ambiguous to which name's hierarchy information of a deepest level of a hierarchy specifically belongs.

As described above, according to the present embodiment, folder names of an intermediate hierarchy are not displayed in the abbreviated manner, and thus even though in a case where folders with a same folder name in the deepest level of the hierarchy are displayed, it becomes easy to determine differences of the folders from one-up folder names.

In addition, according to the present embodiment, in a case where display lines of the document name and the path information of the folder to which the document belong are respectively displayed lengthwise, the folder to which the document belongs is displayed at the head of each display line, and thus it becomes easy to determine whether or not the document is a targeted one.

[Embodiment 2]

According to the embodiment 1, the path information of the folder to which the document belongs is displayed in reverse order. However, in the case where the path information of the folder is displayed in reverse order, in comparing path information of the plurality of folders with one another, differences from root folder may become unclear. The root folder is a top level of the folder in a hierarchy. The root folder may be root directory.

For example, in the display example shown in FIG. 6, in a case where the user wants to compare differences from respective root folder of the path information 654 to 656 of the folders, the user cannot compare them with viewing current display information since display of the respective root folder of the path information 654 and 655 exist outside the display area. Therefore, it is necessary to scroll the display area in the recommendation list display unit 439 to the right using the horizontal scroll bar, and to display the respective root folder of the path information 654 and 655.

Figure 11:
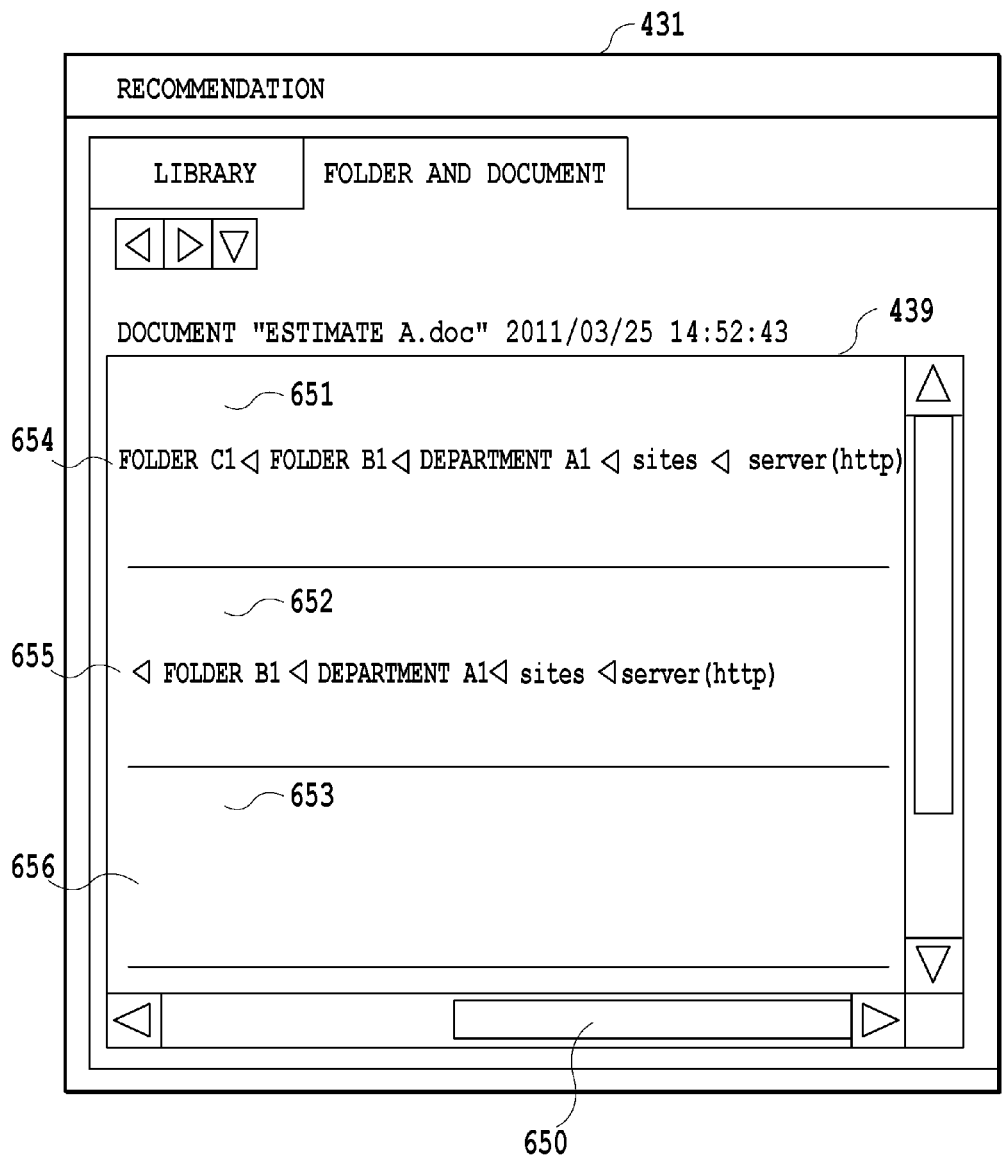
FIG. 11 is a screen view showing a display example in a case where a display area of a recommendation list display unit is scrolled to a right edge.

FIG. 11 is a display example in a case where the display area of the recommendation list display unit 439 in which the path information of the folders is displayed in reverse order is scrolled to a right edge. Namely, FIG. 11 is the display example in a case where the display state shown in the example of FIG. 6 is scrolled to the right edge using the horizontal scroll bar 650. By horizontally scrolling to the right edge, the respective root folder of the path information 654 and 655 have been displayed in the display area. However, display of the label 656 has been then scrolled out to be made to go out of the display area. Therefore, in this state, the differences from the respective root folder of the path information 654 to 656 cannot be also compared with viewing current display information.

In order to solve the problem, the document management client application 301 of the present embodiment 2 performs the following behaviors.

[Behavior in a Case where Horizontal Scroll Bar is Moved from One Side to Other Side]

Figure 13:
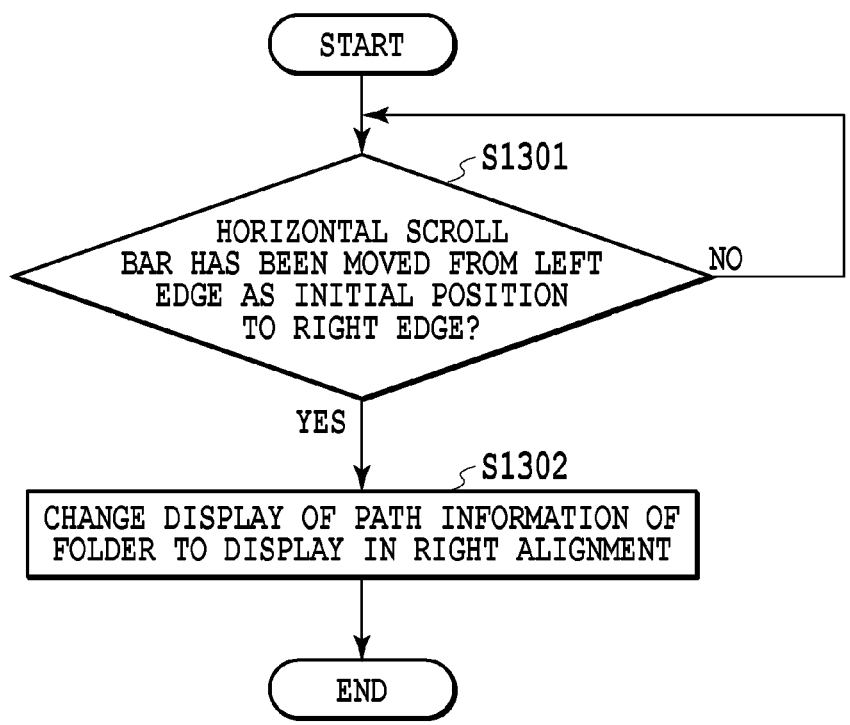
FIG. 13 is a flow chart as one example showing behavior in a case where a horizontal scroll bar is moved in a document management client application in the embodiment 2 of the present invention.

FIG. 13 is a flow chart showing behavior in a case where a horizontal scroll bar is moved in the document management client application 301. Namely, FIG. 13 is the flow chart showing behavior in the case where the horizontal scroll bar is moved in the document management client application 301 from a left edge as an initial position to a right edge.

In detecting that the horizontal scroll bar displayed in the display area of the recommendation list display unit 439 has been moved from the left edge as the initial position through the UI unit 302, the client main control unit 303 implements the following steps.

In step S1301, the client main control unit 303 detects whether or not the horizontal scroll bar has been moved from the left edge as the initial position to the right edge.

In step S1301, in detecting that the horizontal scroll bar has been moved from the left edge as the initial position to the right edge, the client main control unit 303 executes the following step S1302.

In step S1302, the client main control unit 303 changes the display of the path information of the folder to display with right justification. Subsequently, the client main control unit 303 ends the process.

Figure 12:
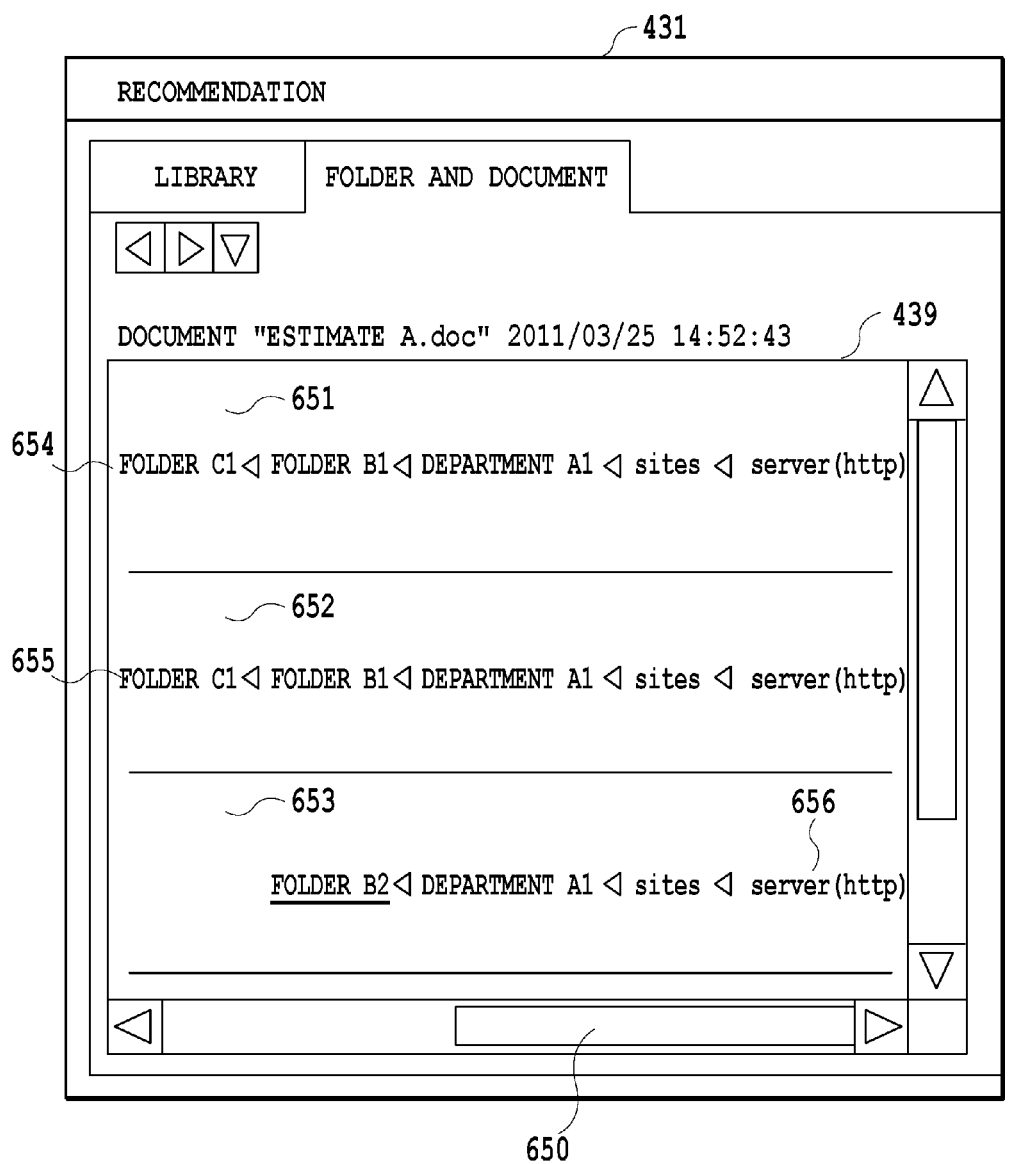
FIG. 12 is a screen view showing a display example in a case where a display area of a recommendation list display unit in an embodiment 2 of the present invention is scrolled to a right edge.

FIG. 12 is a display example with implementing the flow chart of FIG. 13. Display of the path information 654 to 656 of the folder is changed from a display state with left justification (i.e. flush left) in the example of FIG. 6 to a display state with right justification (i.e. flush right).

The display of the path information 654 to 656 of the folder has been changed to the display with right justification, and thereby the differences from the respective root folder of the path information 654 to 656 of the folder are easy to compare respectively.

Figure 14:
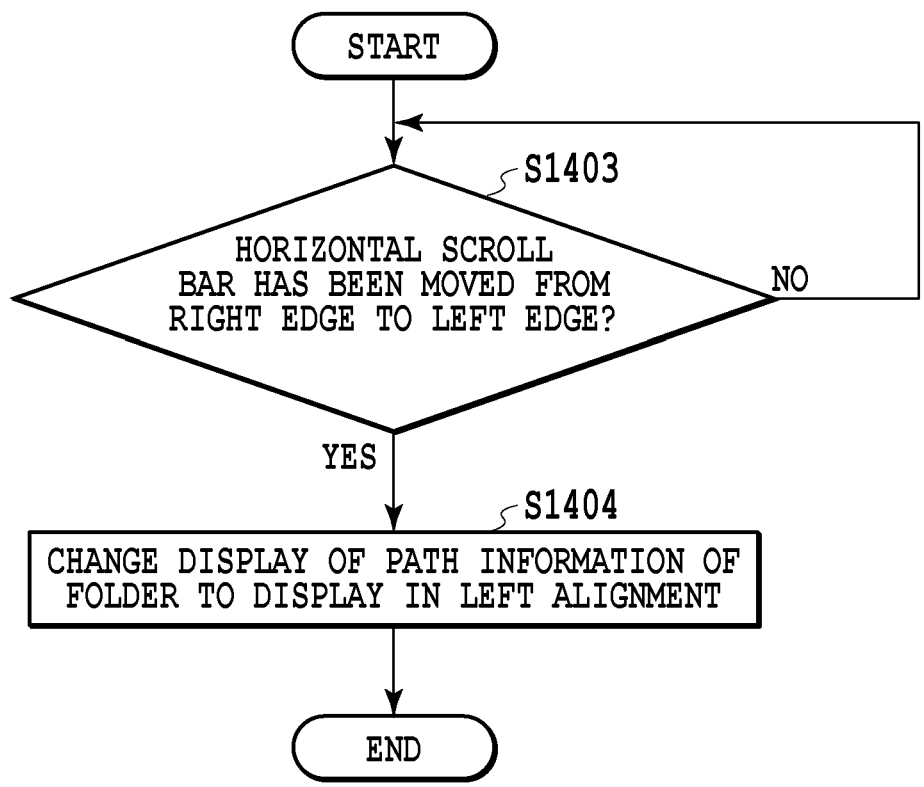
FIG. 14 is a flow chart as one example showing behavior in a case where the horizontal scroll bar is moved in the document management client application in the embodiment 2 of the present invention.

FIG. 14 is a flow chart showing behavior in a case where the horizontal scroll bar is moved in the document management client application 301 from the right edge to the left edge as the initial position.

In detecting that the horizontal scroll bar displayed in the display area of the recommendation list display unit 439 has been moved from the right edge through the UI unit 302, the client main control unit 303 implements the following steps.

In step S1401, the client main control unit 303 detects whether or not the horizontal scroll bar has been moved from the right edge to the left edge as the initial position.

In step S1401, in detecting that the horizontal scroll bar has been moved from the right edge to the left edge as the initial position, the client main control unit 303 executes the following step S1402.

In step S1402, the client main control unit 303 changes the display of the path information of the folder to display with left justification. Subsequently, the client main control unit 303 ends the process. A display example after implementing the flow chart of FIG. 14 changes to that in FIG. 6.

As described above, according to the present embodiment 2, in the case where the horizontal scroll bar is moved to the right edge, the display of the path information of the folder is changed to the display with right justification. Therefore, even though a state where the path information of the folders is displayed in reverse order, it becomes easy to compare the path information of the plurality of folders from the respective root folder thereof.

In addition, according to the present embodiment, the horizontal scroll bar is moved from the state of having been moved to the right edge to the left edge, and thereby the display of the path information of the folder is changed to the display with the original left justification. Therefore, in the case where the link of the document and the link of the path information of the folder to which the document belongs are displayed in line with left justification as described in the embodiment 1, the feature of the display of the path information of the folder in reverse order can be kept.

It is to be noted that according to the above-mentioned embodiment 1, path information of the folder is displayed in reverse order with the folder to which the document belongs being positioned at the head, and thereby the number of times for the user to operate the horizontal scroll bar and to confirm the display of the folders outside the display area can be reduced.

However, as the confirmation for the user to want about the folder display of the intermediate hierarchy still exists, the user confirms the display by moving the horizontal scroll bar in that case. There is a possibility that the number of hierarchies of a portion newly scrolled out to be made to go out of the display area becomes unclear in a case where the display is moved by the horizontal scroll bar. Consequently, in the embodiment 2, the number of hierarchies of the portion hidden by scrolling is displayed in conjunction with scrolling as shown in FIGS. 15 to 17.

Figure 15:
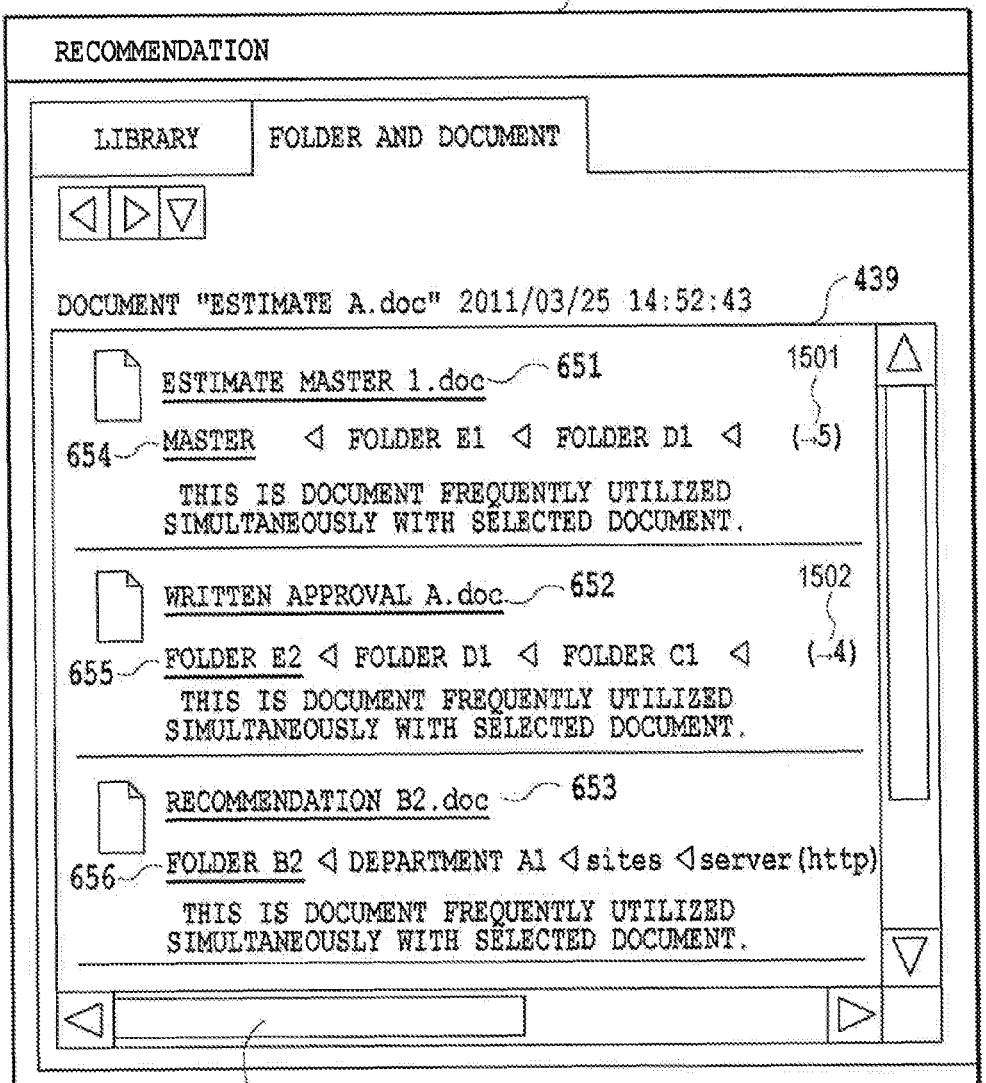
FIG. 15 is a screen view showing a display example in displaying the number of hierarchies outside the display area interlocking with scroll in the embodiment 2 of the present invention.

FIG. 15 is a display example in a state where the horizontal scroll bar is located at the left edge as the initial position. Reference numerals 1501 and 1502 respectively denote labels indicating the number of hierarchies outside the display area of right portions of the folder path information 654 and 655.

Figure 16:
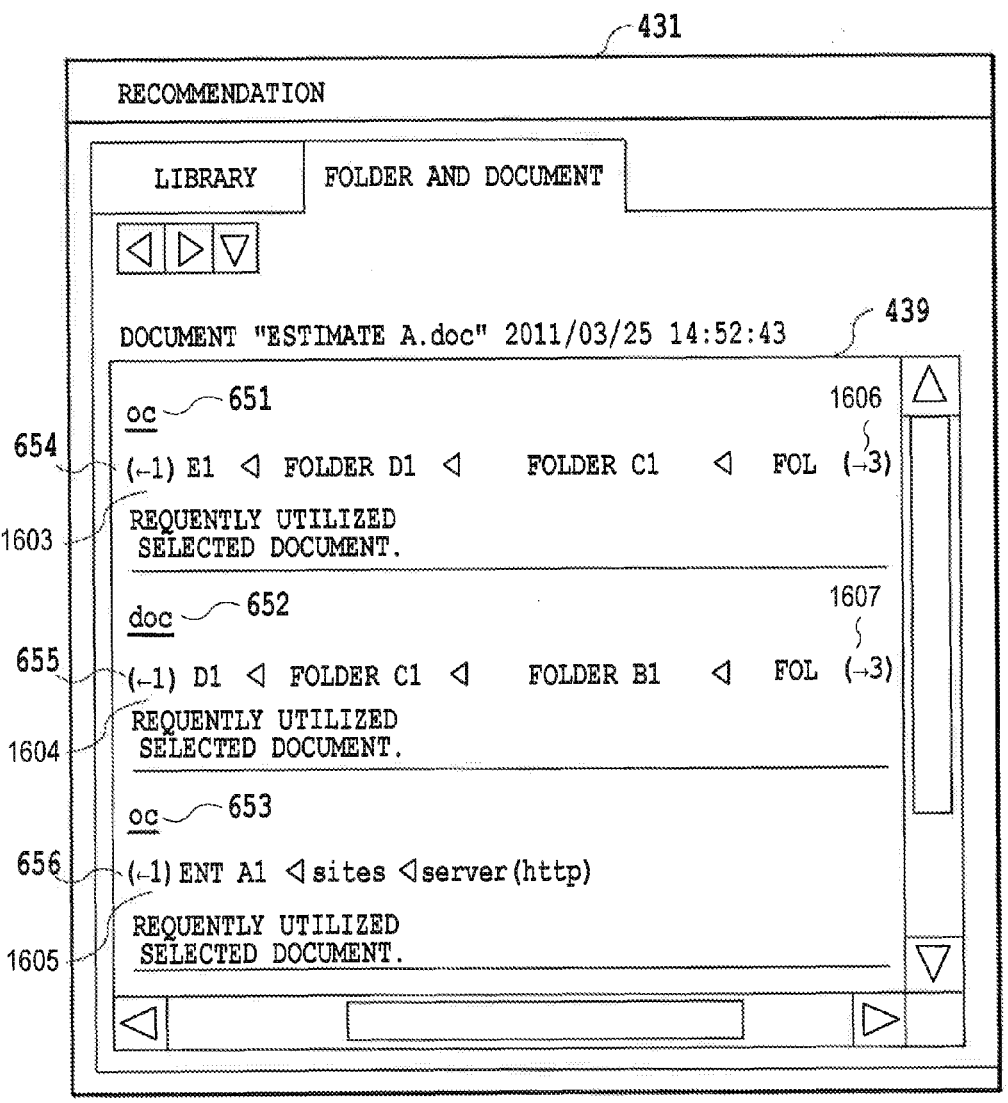
FIG. 16 is a screen view showing other display example in displaying the number of hierarchies outside the display area interlocking with scroll in the embodiment 2 of the present invention.

FIG. 16 is a display example in a state where the horizontal scroll bar is located near a center. Reference numerals 1603 to 1605 respectively denote labels indicating the number of hierarchies outside the display area of left portions of the folder path information 654 to 656. Reference numerals 1606 and 1607 respectively denote labels indicating the number of hierarchies outside the display areas of right portions of the folder path information 654 and 655.

Figure 17:
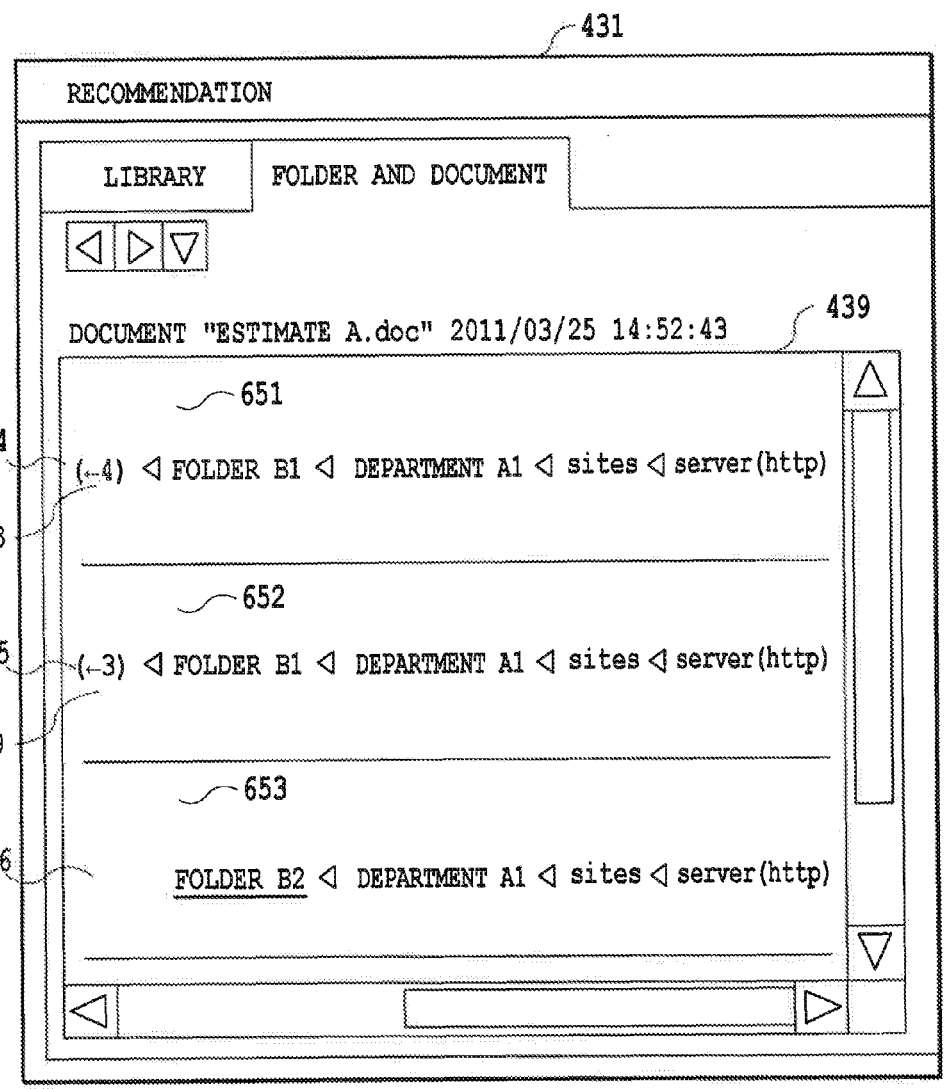
FIG. 17 is a screen view showing other display example in displaying the number of hierarchies outside the display area interlocking with scroll in the embodiment 2 of the present invention.

FIG. 17 is a display example in a state where the horizontal scroll bar is located at the right edge. Reference numerals 1708 and 1709 respectively denote labels indicating the number of hierarchies outside the display area of left portions of the folder path information 654 and 656.

FIG. 17 is a display example in a state where the horizontal scroll bar is located at the right edge. Reference numerals 1008 and 1009 respectively denote labels indicating the number of hierarchies outside the display area of left portions of the folder path information 654 and 656.

As mentioned above, by displaying the number of hierarchies of the hidden portions located outside the display area in conjunction with the horizontal scrolling, the user can grasp the number of hierarchies of the folder path information.

<Other Embodiment>

In the embodiment 1, describing the example where the path information is displayed from the left to the right, the processing that displays the horizontal scroll bar has been described, for example, in S502 of FIG. 5A. However, for example, in a state where path information is displayed in a longitudinal direction, a vertical scroll may be displayed instead of the horizontal scroll.

In addition, in the above each embodiment, although describing a state in which the path information is displayed from the left to the right, in a language state where path information is displayed from the right to the left, the right and the left in the description of the above each embodiment can be reversed.

In addition, although target data is described as a document in the above each embodiment, arbitrary file formats, such as an image, a moving image, and voice, may be used as the target. Namely, the document management server 101 may manage other format files besides the document, and may transmit a recommendation list including a list of other format files according to a request for recommendation list acquisition.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-124798, filed May 31, 2012, which is hereby incorporated by reference herein in its entirety.

What is claimed is:

1. An information processing apparatus comprising;
  a processor and a memory, cooperating to function as:
  a determination unit configured to determine whether or not path information fits in a display area; and
  a display unit configured to display the path information in the display area in reverse hierarchical order so that information of a deepest level of a hierarchy is displayed at a head of the path information, in a case where it is determined by the determination unit that the path information does not fit in the display area.

2. The information processing apparatus according to claim 1, wherein in a case where a plurality of path information are displayed in the display area, the display unit displays in reverse hierarchical order only the path information determined not to fit in the display area by the determination unit.

3. The information processing apparatus according to claim 1, wherein in a case where a plurality of path information are displayed in the display area, the display unit displays all of the path information in reverse hierarchical order.

4. The information processing apparatus according to claim 1, further comprising a setting unit configured to set display order of path information, wherein the display unit changes hierarchical order to display the path information based on a setting of the setting unit.

5. The information processing apparatus according to claim 1, wherein in a case of displaying path information in reverse hierarchical order, the display unit displays the path information a part of which is abbreviated.

6. The information processing apparatus according to claim 1, wherein information of the number of levels of the hierarchy of path information that is not displayed in the display area is displayed.

7. An information processing apparatus comprising:
a processor and a memory, cooperating to function as:
a horizontal scroll bar display unit configured to display a horizontal scroll bar for scrolling information displayed in a display area; and
a display unit configured to display path information in the display area in reverse hierarchical order so that information of a deepest level of a hierarchy is displayed at a head of the path information, in a case where the horizontal scroll bar is displayed by the horizontal scroll bar display unit.

8. An information processing method, executed by a processor and a memory of an information processing apparatus, comprising the steps of:
determining whether or not path information fits in a display area; and
displaying the path information in the display area in reverse hierarchical order so that information of a deepest level of a hierarchy is displayed at a head of the path information, in a case where it is determined by the determination step that the path information does not fit in the display area.

9. A non-transitory computer-readable storage medium storing a computer program that, when executed by a processor, causes a computer to execute steps of:
determining whether or not path information fits in a display area; and
displaying the path information in the display area in reverse hierarchical order so that information of a deepest level of a hierarchy is displayed at a head of the path information, in a case where it is determined by the determining step that the path information does not fit in the display area.

* * * * *